US012735218B2

(12) United States Patent
Borelli et al.

(10) Patent No.: US 12,735,218 B2
(45) Date of Patent: Sep. 15, 2026

(54) METHOD AND SYSTEM FOR CONTROLLING TUBE ORIENTATION IN A FOOD PACKAGING SYSTEM

(71) Applicant: Tetra Laval Holdings & Finance S.A., Pully (CH)

(72) Inventors: Gabriele Borelli, Spilamberto (IT); Stefano Fornasari, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 439 days.

(21) Appl. No.: 18/257,863

(22) PCT Filed: Dec. 17, 2021

(86) PCT No.: PCT/EP2021/086366

§ 371 (c)(1),
(2) Date: Jun. 15, 2023

(87) PCT Pub. No.: WO2022/129450

PCT Pub. Date: Jun. 23, 2022

(65) Prior Publication Data

US 2024/0067378 A1 Feb. 29, 2024

Related U.S. Application Data

(60) Provisional application No. 63/126,858, filed on Dec. 17, 2020.

(51) Int. Cl.
*B65B 41/16* (2006.01)
*B65B 3/00* (2006.01)
(Continued)

(52) U.S. Cl.
CPC ................ *B65B 41/16* (2013.01); *B65B 3/00* (2013.01); *B65B 3/26* (2013.01); *B65B 9/20* (2013.01);
(Continued)

(58) Field of Classification Search
CPC ..................................................... B65B 41/16
See application file for complete search history.

(56) References Cited

U.S. PATENT DOCUMENTS 5,148,841 A 9/1992 Graffin et al.
6,397,557 B1 6/2002 Bassissi et al.
(Continued)

FOREIGN PATENT DOCUMENTS

EP 0 614 809 A2 9/1994
EP 0 950 608 A1 10/1999
(Continued)

OTHER PUBLICATIONS

International Search Report and Written Opinion in PCT/EP2021/086366 mailed on Apr. 19, 2022 in 10 pages.
(Continued)

*Primary Examiner* — Miranda M Huang
(74) *Attorney, Agent, or Firm* — Knobbe, Martens, Olson & Bear, LLP

(57) ABSTRACT

Methods and apparatus, including computer program products, are described for managing tube orientation in a food packaging machine, wherein the food packaging machine comprises a plurality of sub-systems. One or more variable values are received, which indicate measurements by the food packaging machine of one or more physical parameters in one or more of the sub-systems, the one or more physical parameters affecting tube orientation. One or more control parameter values are determined for one or more of the sub-systems, by processing the received variable values using a reinforcement learning model and a local control model. One or more control parameters of the one or more sub-systems are adjusted in accordance with the determined control parameter values.

13 Claims, 3 Drawing Sheets

(51) Int. Cl.

| | |
|---|---|
| ***B65B 3/26*** | (2006.01) |
| ***B65B 9/20*** | (2012.01) |
| ***B65B 9/213*** | (2012.01) |
| ***B65B 37/00*** | (2006.01) |
| ***B65B 43/08*** | (2006.01) |
| ***B65B 43/42*** | (2006.01) |
| ***B65B 51/14*** | (2006.01) |
| ***B65B 57/00*** | (2006.01) |
| ***B65B 57/02*** | (2006.01) |
| ***B65B 57/04*** | (2006.01) |
| ***B65B 57/14*** | (2006.01) |
| ***B65B 59/00*** | (2006.01) |
| ***B65H 23/04*** | (2006.01) |
| ***B65H 23/188*** | (2006.01) |
| ***G05B 13/02*** | (2006.01) |

(52) U.S. Cl.

CPC .............. *B65B 9/213* (2013.01); *B65B 37/00* (2013.01); *B65B 43/08* (2013.01); *B65B 43/42* (2013.01); *B65B 51/146* (2013.01); *B65B 57/00* (2013.01); *B65B 57/02* (2013.01); *B65B 57/04* (2013.01); *B65B 57/145* (2013.01); *B65B 59/003* (2019.05); *B65H 23/048* (2013.01); *B65H 23/1888* (2013.01); *G05B 13/024* (2013.01); *G05B 13/027* (2013.01); *B65B 2210/04* (2013.01); *B65H 2511/112* (2013.01); *B65H 2557/24* (2013.01); *B65H 2557/264* (2013.01); *B65H 2801/69* (2013.01)

(56) References Cited

U.S. PATENT DOCUMENTS

| | | | | |
|---|---|---|---|---|
| 6,732,496 | B1 | 5/2004 | Wessman et al. | |
| 7,827,768 | B2 | 11/2010 | Rosberg et al. | |
| 10,343,803 | B2 | 7/2019 | Scarabelli et al. | |
| 10,399,724 | B2 | 9/2019 | Aiello et al. | |
| 2009/0178728 | A1 | 7/2009 | Cochran et al. | |
| 2009/0266034 | A1* | 10/2009 | Rosberg .................. | B65B 57/04 53/548 |
| 2018/0057199 | A1* | 3/2018 | Aiello ..................... | B65B 55/04 |
| 2019/0196417 | A1* | 6/2019 | Uno ....................... | G05B 11/42 |
| 2020/0250109 | A1 | 8/2020 | Yaavoc et al. | |
| 2020/0299120 | A1 | 9/2020 | Bhaskar et al. | |

FOREIGN PATENT DOCUMENTS

| | | | |
|---|---|---|---|
| EP | 3 670 407 | A1 | 6/2020 |
| EP | 3 725 689 | A1 | 10/2020 |
| EP | 3 741 690 | A1 | 11/2020 |
| JP | H07-36506 | A | 2/1995 |
| JP | 2019-117458 | A | 7/2019 |
| WO | WO 2019/188931 | A1 | 10/2019 |

OTHER PUBLICATIONS

Office Action with Search Report in corresponding Chinese patent application No. 202180083788.5 dated May 1, 2025.

Office Action received in corresponding Japanese Application No. 2023-535994 dated Apr. 24, 2025.

* cited by examiner

METHOD AND SYSTEM FOR CONTROLLING TUBE ORIENTATION IN A FOOD PACKAGING SYSTEM

TECHNICAL FIELD

The invention relates to food packaging systems, and more specifically to tube orientation in a food packaging system.

BACKGROUND

Automation control systems are used in a wide range of manufacturing and processing settings today and have continuously grown in complexity. A common approach for managing this complexity is to divide the system into sub-systems and develop suitable control mechanisms for each sub-system. However, this approach does not always result in an optimal solution for the system as a whole.

Capturing influencing factors from different sources becomes increasingly difficult as a system gets more complex and the number of influencing factors grows. This complexity further increases when the relationships between influencing factors, control variables and the system itself are non-linear and/or difficult to model.

With regards to the level of abstraction in industrial control, two main perspectives can be taken: low level control and high level control, respectively. Low level control implies the management of individual automation components (e.g., actuators, servo motors, heaters and many other devices). High level control can grow in abstraction going from a sub-system level, to a system level, and further to the orchestration of an entire plant with multiple systems and sub-systems that need to operate in concert.

As an example, food processing and packaging equipment typically includes several sub-systems, such as a filling system, a sterilizing system, a package folding system, etc. Each sub-system contains a number of different elements (e.g., pneumatic actuators, servo motors, DC motors, AC motors, sensors, other actuators, etc.). These individual elements are typically controlled by a low level, local control system that exploits conventional control techniques, such as Proportional Integral Derivative (PID) controllers, to control a target variable. A feedback loop is used to keep the error of the controller low with respect to a target working point of the element, system, or sub-system.

However, PID controllers need to be tuned for their specific application and are usually optimized for a specific working range and working dynamics. They are also not very well suited to adapt to unforeseen circumstances or working conditions that are outside of their conventional working zone. When such conditions change (e.g., different working environment, changes in the automation element, changes in the manufacturing process, etc.) the parameters of the PID controller often need to be tuned and re-calibrated. This can be a time-consuming and complex process that requires significant manual input from experienced personnel, especially when a large number of elements and/or sub-systems are involved, such as is typically the case in food processing and packaging equipment.

A filling machine is an example of a complex system that packages liquid, semi-liquid or pourable food products, such as fruit juice, UHT (ultra-high temperature treated) milk, wine, tomato sauce, etc., into composite packages made of a multilayer composite packaging material for distribution and sale. A typical example is the parallelepiped-shaped package for pourable food products known as Tetra Brik Aseptic™, which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also includes a layer of oxygen-barrier material, e.g. an aluminum foil, which is superimposed on a layer of heat-seal plastic material, and is in turn covered with another layer of heat-seal plastic material forming the inner face of the package eventually contacting the food product.

The filling machine starts from a web of multilayer composite packaging material (wound from a reel). The web is fed through the filling machine, wherein a tube is formed from the web by producing a longitudinal sealing. A specified amount of the food product is fed into the tube via a pipe; a lower end of the tube is then fed into a folding device (often referred to as a "jaw system"), in which a transversal sealing is produced, the tube being folded according to folding lines, also referred to as weakening lines, and then cut off such that the composite packages filled of the liquid food product are formed.

When the tube is formed, a problem might occur that is known as "tube twisting." This is an unstable behavior mode of the packaging material tube, in which the tube formed by the packaging web rotates clockwise or counter clockwise around its central axis due to a sideways displacement of the web along one or more rollers in the food packaging machine. Some common causes for this displacement include poor web alignment, splicing events, "Long Edge" defect of the packaging material reel (slitting), or Improper/Uneven interaction between jaws/volume flaps and the tube. Tube twisting negatively impacts the output of the packaging system and the quality of the packages. For example, the tube may not align properly with the jaw system, which can cause design issues (both in terms of aesthetics and in terms of package integrity) as the misalignment may cause packages to be improperly sealed (e.g., the area on the packaging web where the sealing is supposed to occur is no longer within the range of the device effectuating the sealing) and cut by the jaw system. This is a particularly important issue when the contents of a package need to be kept sterile.

As many of these events may occur in other sub-systems of the food packaging machine, there is no way for the local PID controller of the tube orientation sub-system to take such events into account, and thus no way to proactively account for such factors. As a result, the local PID controller may overcompensate for any issues it detects, resulting in a poor correction of the tube orientation issues. In addition, the PID gains often need to be manually tuned by a technician whenever the type of packages produced by the food packaging machine changes, which often results in costly downtime of the food packaging machine. Thus, there is a need for improved techniques for controlling the tube orientation in general and controlling the tube twisting in particular, which also take into account a range of events that occur in the packaging machine.

SUMMARY

It is an object of the invention to at least partly overcome one or more limitations of the prior art. In particular, it is an object to provide methods and systems that make it possible to improve tube orientation in a tube orientation sub-system of the food packaging machine in response to various events that occur in the food packaging machine by taking into account measured parameter values not only for the local tube orientation sub-system, but also for other, remote, sub-systems in the food packaging machine, so as to avoid tube twisting and other tube orientation problems. As a result, an increased stability of the tube formation sub-system to adverse events can be achieved and fewer packages need to be discarded, ultimately having a beneficial effect on the environment as well as the amount of wasted food product.

In one aspect of the invention, this is achieved by a method for managing tube orientation in a food packaging machine, wherein the food packaging machine comprises a plurality of sub-systems. The method includes:

- receiving one or more variable values indicating measurements by the food packaging machine of one or more physical parameters in one or more of the sub-systems, the one or more physical parameters affecting tube orientation;
- determining one or more control parameter values for one or more of the sub-systems, by processing the received variable values using a reinforcement learning model and a local control model; and
- adjusting one or more control parameters of the one or more sub-system in accordance with the determined control parameter values.

The exploitation of both local variables and inputs from remote sub-systems results in more precisely controlled tube orientation and a more resilient operation that is less prone to tube twisting or other problems when unexpected adverse events occur in the tube formation sub-system, or in other remote sub-systems, of the food packaging machine. As mentioned above, this results in fewer wasted packages (and food product), and thus more efficient and environmentally friendly operation of the food packaging machine. Given the ability to better control the tube orientation, shorter time to market for new products and/or configurations is also made possible as less manual testing is needed. This is further enhanced as control policies can be learned in simulated environment, such that the food packaging machine does not need to be manually configured "from scratch".

In one embodiment, the reinforcement learning model is a deep reinforcement learning model including a neural network. Deep reinforcement learning is particularly useful when evolving control policies for sub-systems that must consider a large number of variables whose internal relations and effects on the sub-system may not be known, and presents a more sophisticated approach to determining the one or more control parameter values for the local tube formation sub-system of the food packaging machine than what might be possible using conventional reinforcement learning without a neural network.

In one embodiment, adjusting one or more control parameters includes adjusting a tilt of one or more rollers in the food packaging machine to move the web laterally along the length of the roller. For example, imagine a horizontal roller across which the web runs. By tilting the roller, i.e., moving the right or left edge of the roller up and down in a vertical direction, the web will move either left or right along the length of the roller, i.e., laterally towards either end of the roller, as the web entering onto the roller will align its direction of travel perpendicular to the roller axis. This sideways movement of the web causes the tube to twist in either a clockwise or counterclockwise direction as the tube is being formed, and can thus be used as a means to mitigate tube twisting issues.

In one embodiment, adjusting the tilt of one or more rollers further causes a tube formed by the web to twist in a clockwise or counterclockwise direction around a central axis of the tube, as described above.

In one embodiment, the neural network is a convolution neural network, a recurrent neural network, a Long Short-Term Memory neural network, or a fully connected neural network. These are all different types of neural networks that are well known to those having ordinary skill in the art and are thus more easily incorporated into existing food packaging machine settings.

In one embodiment, the one or more variable values include measurements relating to one or more of: packaging web movement and control variables, web tension variables, packaging material characteristics, and food product type. These are all common parameters that are measured in most conventional packaging and production systems. Using these parameters to better control the sub-systems of the food packaging machine, as is accomplished by the data-driven approach of the various embodiments described herein, significantly enhances the operation of the tube formation sub-system, and thus the overall operation of the food packaging machine.

Other aspects of the invention include a system and a computer program for tube orientation in a food packaging machine. The features and advantages of these aspects of the invention are substantively the same as those discussed above for the method.

Still other objectives, features, aspects and advantages of the invention will appear from the following detailed description as well as from the drawings.

DRAWINGS

Embodiments of the invention will now be described, by way of example, with reference to the accompanying schematic drawings.

DETAILED DESCRIPTION

Figure 1:
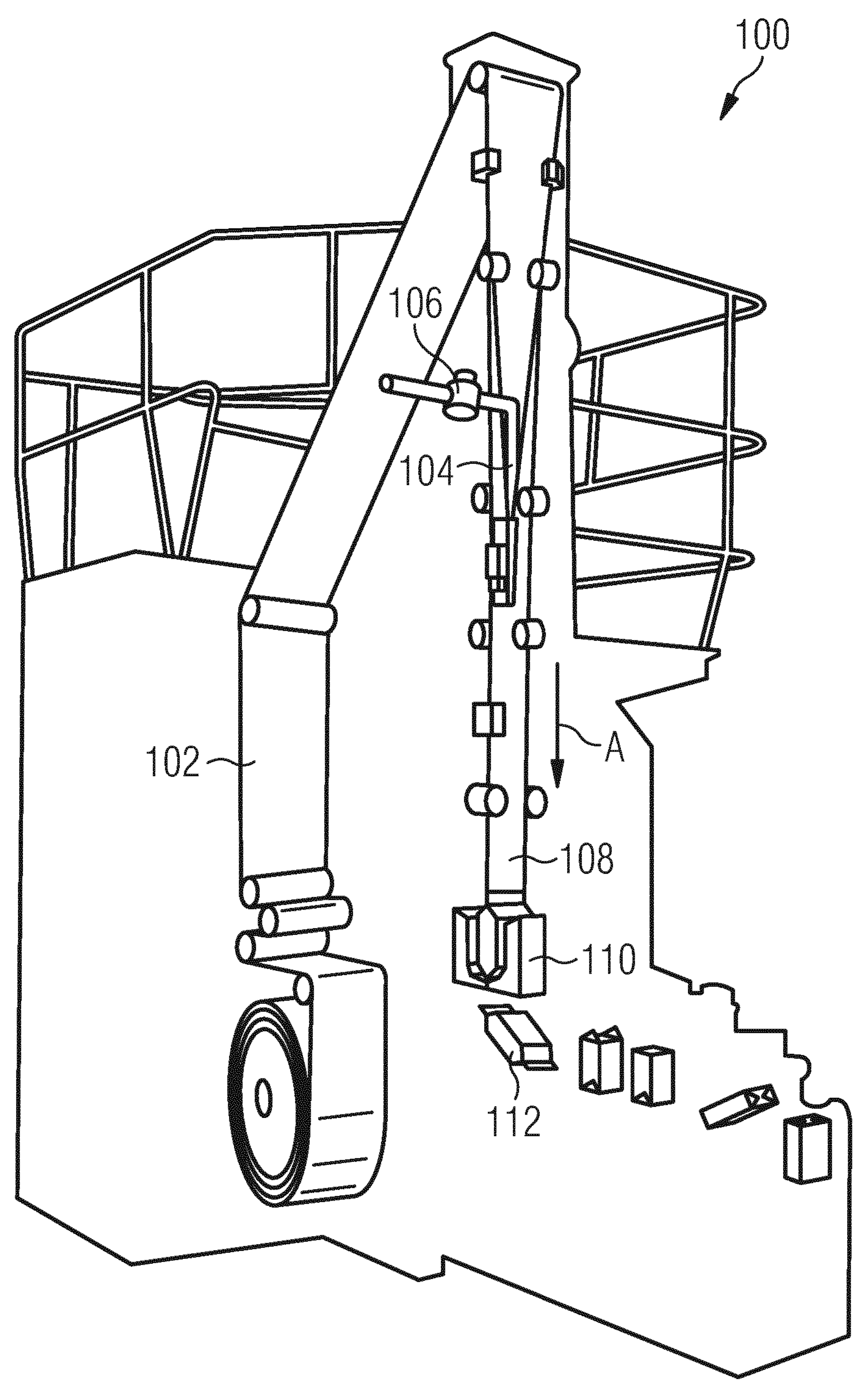
FIG. 1 is a schematic diagram of a portion of a food packaging machine, in accordance with one embodiment.

As was mentioned above, a goal with the various embodiments of the invention is to provide improved control techniques for equipment and systems relating to food processing and packaging, and in particular with respect to tube orientation in a food packaging machine. As was also mentioned above, tube twisting is a problem that may result in wasted packages, which is undesirable from a food waste and an environmental point of view. Also, currently considerable time and labor is involved in setting up the tube formation sub-system when a food packaging machine is first put into operation, in order to minimize the risk that tube twisting will occur. By applying the general concepts of reinforcement learning and/or deep reinforcement learning techniques to control a tube formation sub-system of the food packaging machine, a larger range of factors can be taken into account compared to what is possible in existing systems and the tube orientation can be adjusted very precisely by adjusting local parameters for a tube formation sub-system and/or adjusting parameters in other sub-systems of the food packaging machine, such that tube twisting is less likely to occur and the food packaging machine can be used more efficiently with fewer discarded food packages.

Both reinforcement learning and deep reinforcement learning are examples of machine learning techniques. In general, reinforcement learning (RL) can be characterized as dynamically learning through the use of positive or negative rewards. A system performance is evaluated with respect to a desired target. If the target is reached or not, a positive reward is delivered, and if the target is not reached, a negative reward is delivered. As the positive and negative rewards accumulate over time, the RL model evolves a control policy for the system, with the goal of maximizing the outcome. Deep reinforcement learning (DRL) can be characterized as an enhancement of RL, in which RL is used together with a neural network when evolving the control policy for the system.

In the context of food processing and packaging, RL (i.e., agent-environment interaction) can be used to evolve a control policy for a food processing and/or packaging machine. Using DRL (i.e., RL together with a neural network) can be particularly useful when evolving control policies for sub-systems, such as the filling sub-system, that must consider a large number of variables whose internal relations and effects on the sub-system may not be known. In addition, it should be noted that RL and DRL techniques can also be used to improve existing, local control techniques, in essence by "filling in the gaps" of conventional control techniques with this data-driven approach. Thus, the DRL algorithm can then directly (or indirectly through other control layers, e.g., by tuning the gains of a conventional PID controller to allow the PID controller to operate more efficiently compared to the conventional control techniques) control the actuators (e.g., servomotors, pneumatic actuators or other actuators) that prevent the tube from twisting, and keep the orientation of the tube stable.

In order to further illustrate these principles, various embodiments of the invention will now be described more fully by way of example of controlling a tube formation sub-system in a food packaging machine, and with reference to the accompanying drawings in which some, but not all, embodiments of the invention are shown. The invention may be embodied in many different forms and should not be construed as limited to the embodiments set forth herein. As was mentioned above, the tube formation sub-system is an important part of a food packaging machine, and its operation needs to be carefully controlled in order to ensure that tube twisting does not occur when adverse events occur in other sub-systems of the food packaging machine.

FIG. 1 generally illustrates a food packaging machine 100. In the illustrated example, the food packaging machine 100 is a roll-fed carton packaging machine. The general 20 principle of such a food packaging machine is that a web 102 is formed from a roll of packaging material. The food packaging machine 100 may comprise a roll receiver (not illustrated in the figure) for receiving the roll of packaging material. Although not illustrated, if needed in order to fulfill food safety regulations, the web 102 may be sterilized using a hydrogen peroxide bath, a Low Voltage Electron Beam (LVEB) device or any other apparatus capable of reducing a number of unwanted microorganisms.

After sterilization, by using a tube former, the web 102 can be formed into a tube 104 in a tube formation sub-system. According to one non-limiting example, the tube former may include a longitudinal sealing device, which seals the long edges of the web to one another in order to form the tube. When having formed the tube a food product, for instance milk, can be fed into the tube 104 from a food product filling device via a pipe 106 placed at least partly inside the tube 104. A food product in this context refers to anything that people or animals ingest, eat and/or drink or that plants absorb, including but not limited to liquid, semi-liquid, viscous, dry, powder and solid food products, drink products, and water. For the avoidance of doubt, food products also include ingredients for preparing food. Some examples of food products include milk, water and juice.

In order to form a package 112 from the tube 104 filled with product, a transversal sealing can be made in a lower end of the tube by using a sealing sub-system 110, also often referred to as a "jaw system." Generally, the sealing sub-system 110 has two main functions—providing the transversal sealing, i.e. welding two opposite sides of the tube 104 together such that the product in a lower part of the tube 104, placed downward the sealing sub-system 110, is separated from the product in the tube 104 placed upward the sealing sub-system 110, and cutting off the lower part of the tube 104 such that a package 112 is formed. Alternatively, instead of providing the transversal sealing and cutting off the lower part in one and the same apparatus as illustrated, the step of cutting off the lower part may be made in a subsequent step by a different piece of equipment, or by the consumer if the packages are intended to be sold in a multi-pack.

Figure 2:
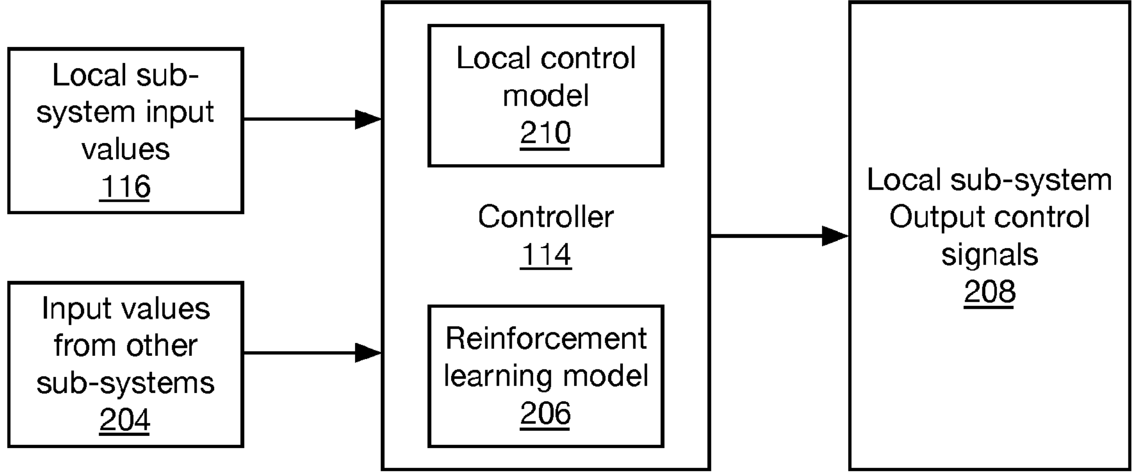
FIG. 2 is a schematic diagram of a controller in a food packaging machine, in accordance with one embodiment.

The tube formation sub-system is controlled by a controller 114, schematically illustrated in FIG. 2, which receives input from various sub-systems of the food packaging machine 100, which may experience events that also influence the operation of the tube formation sub-system. These events and external factors can be represented by a set of variables, whose values indicate various states at different sub-systems of the food packaging machine 100. FIG. 2 shows how the input from the local sensor 116 of the tube formation sub-system is input to the controller 114 along with the input values 204 from other, remote sub-systems of the food packaging machine.

In one embodiment, some examples of variables representing physical parameters that can affect the tube formation sub-system include:

- web movement and control variables (e.g., start, stop, accelerations, and decelerations of the web 102),
- web tension variables (e.g., a web tension set point (i.e., a desired web tension for the particular type of web 102 being used in the food packaging machine 100), and/or a web current web tensioning system position (i.e., a current web tension as registered by a web tensioning sub-system of the food packaging machine 100),
- packaging material characteristics (e.g., length and width of the web, packaging material stiffness and thickness, etc.) and
- food product type (e.g., density, volume, etc.).

The web movement and web tension variables can be considered "dynamic" variables, whereas the packaging material characteristics and food product type variables, on the other hand, are static variables, that is, they relate to physical properties. As can be realized, these are merely a few examples of possible influencing factors from other sub-systems or external systems, and should not be considered as an exhaustive list. However, they do represent influencing factors which cannot be considered by conventional tube formation systems, as it is difficult or impossible to determine how various possible combination of these factors should influence the operation of the tube formation sub-system.

In accordance with the various embodiments described herein, the controller 114 uses a local control model 210 to process the local tube formation sub-system input variables 116 (e.g., signals from an edge detector or from positional markings on the web, in combination with a reinforcement learning model 206 to process the input values from the other sub-systems of the filling machine, to determine how all the measured variables as a whole collectively influence the operation of the tube formation sub-system. The local control model 210 can be an algorithm executed by a PID controller. The reinforcement learning model 206 can be a deep reinforcement learning model, which includes one or more neural networks, as described above. In some embodiments, the local sub-system input variables 116 can be processed by the reinforcement learning model 206. In some embodiments, the reinforcement learning model 206 can be used to figure out how different combinations of local and remote variables should influence the tube formation sub-system and use this insight to improve the local control model 210. Based on the result of this processing and determination, the controller 114 generates a set of output control signals 208 for the local tube formation sub-system, which control actuators, such as servomotors, pneumatic actuators or other actuators to prevent tube twisting (e.g., by changing the tilt of one or more rollers as described above).

Figures 3A, 3B, 3C:
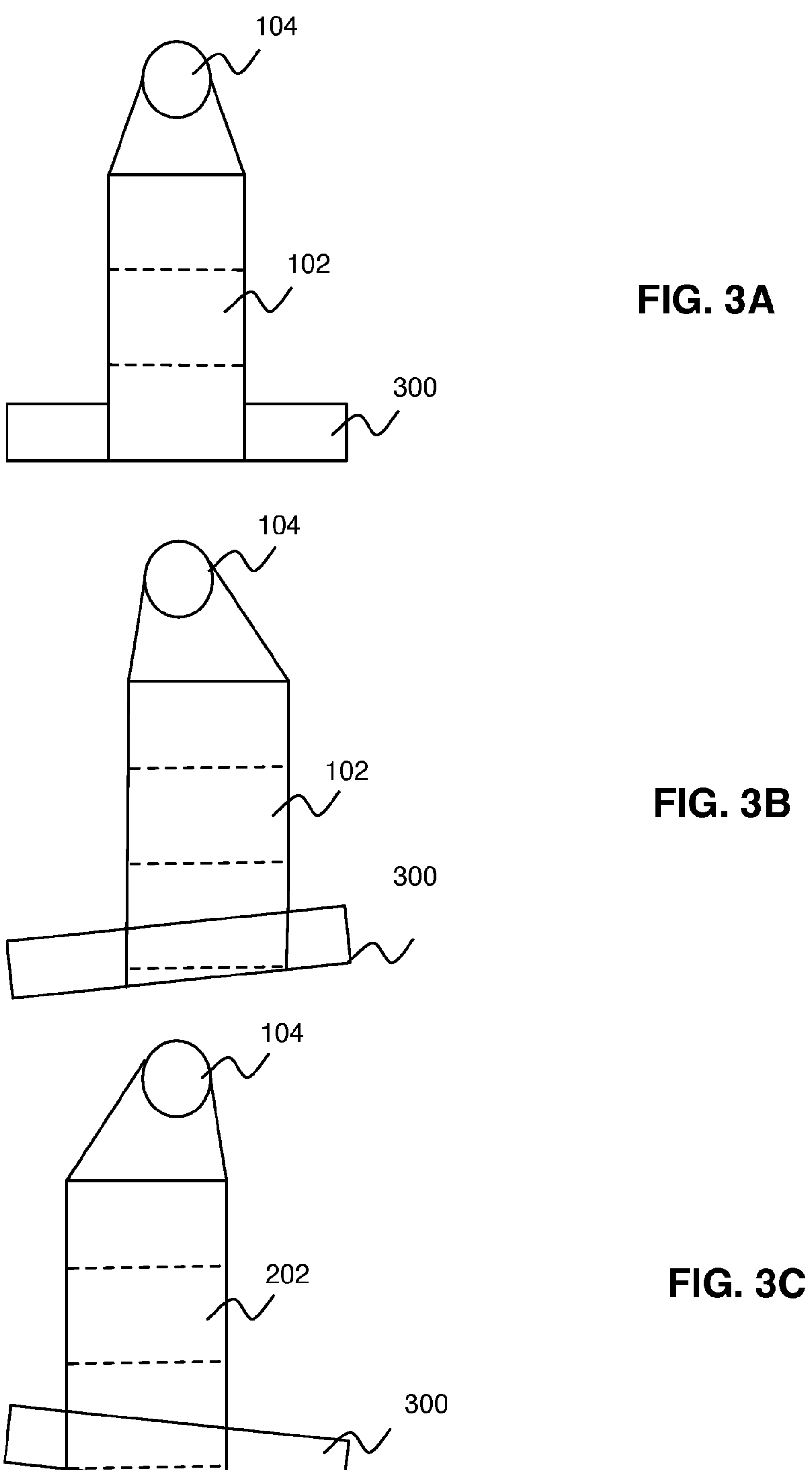
FIG. 3A is a schematic diagram illustrating a web moving laterally across a roller in the food packaging machine of FIG. 1, when the roller is in a horizontal position, in accordance with one embodiment.
FIG. 3B is a schematic diagram illustrating a web moving laterally across a roller in the food packaging machine of FIG. 1, when the roller is turned slightly counterclockwise, in accordance with one embodiment.
FIG. 3C is a schematic diagram illustrating a web moving laterally across a roller in the food packaging machine of FIG. 1, when the roller is turned slightly clockwise, in accordance with one embodiment.

FIGS. 3A-3C schematically show how changing the tilt of a roller can affect tube orientation, in accordance with one embodiment. FIG. 3A schematically illustrates a neutral position, in which the web 102 runs across a roller 300, from the bottom of the figure towards the top of the figure, where a tube 104 is formed by adhering the long edges of the web 102 to one another. In order to control the tube orientation, the roller 300 can be tilted in a clockwise or a counterclockwise direction by an actuator (not shown). FIG. 3B schematically illustrates a state where the roller 300 has been turned a few degrees counterclockwise. As a result, the web 102 moves laterally across the roller 300, towards the right side of the figure, in an attempt to line up perpendicularly to the roller 300. This lateral move causes the tube 104 to twist in a counterclockwise direction. Similarly, FIG. 3C schematically illustrates a state where the roller 300 instead has been turned a few degrees clockwise. As a result, the web 102 moves laterally across the roller 300, towards the left side of the figure, again in an attempt to line up perpendicularly to the roller. This lateral move causes the tube 104 to twist in a clockwise direction. As can be understood, adjusting the tilt of the roller 300 is one possible mechanism for preventing tube twisting from occurring in the food packaging machine 100.

In some embodiments, the controller 114 also generates a set of control signals 208 for other sub-systems of the food packaging machine 100 to correct problems arising in those sub-systems and which impact the tube orientation, i.e., in essence addressing the "root cause" of any tube orientation problems, such as tube twisting. Having an approach where tube orientation problems are addressed both locally (i.e., in the tube formation sub-system) and remotely (i.e., in other sub-systems of the food packaging machine 100), may even further improve the tube formation process.

Examples of neural networks that can be used in embodiments that use a deep reinforcement learning model include, for example, a Convolution Neural Network (CNN) that has been trained using reinforcement learning and deep reinforcement learning, or a Recurrent Neural Network (RNN), such as a Long Short-Term Memory (LSTM) neural network, which is often used in the field of deep learning, or a fully connected neural network (FCNN). The LSTM network may be particularly useful since, unlike standard feedforward neural networks, the LSTM has feedback connections. This enables the LSTM to process not only single data points, but also entire sequences of data, which can be particularly useful in the context of a food packaging machine designed to generate a large number of packages.

Conventional control techniques often require a manual calibration for each different working setup, e.g., package size, food product type, etc., which can often be a very time consuming process. In contrast, this embodiment of the invention allows for a training environment to be provided, in which simulations can be made for how different parameters vary, which enables the controller 114 to learn the optimal control policy given the goal for the tube formation sub-system. This may save a considerable number of man-hours in setting up the packaging machine, and thereby also reduce the time to market of new packages and products. As was noted above, in some embodiments, the output from the reinforcement learning model can be used to tune the gains of a conventional PID controller, such that the PID controller can operate more efficiently compared to the conventional control techniques where it relies only on local variable values.

It should be noted that even though a sub-system has been referred to above as a tube formation system, filling system, a sterilizing system, a package folding system, etc. it can also refer to a portion of the above-mentioned sub-system, or individual elements.

It should be noted that in some embodiments, the control models for the controller 140 can reside within the controller 140 itself, as illustrated in FIG. 2. In other embodiments, they may reside in and operate from external hardware/software (e.g., an external computer or similar processing equipment) to further accelerate the required computations and the controller 140 in the food packaging machine may be a simpler controller that merely executes the functionality, as determined by the external hardware/software.

The systems and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, optical or magnetic storage devices, or any other medium which can be used to store the desired information and which can be accessed by a computer.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the description above follows that, although various embodiments of the invention have been described and shown, the invention is not restricted thereto, but may also be embodied in other ways within the scope of the subject-matter defined in the following claims.

The invention claimed is:

1. A method for managing tube orientation in a food packaging machine, the method comprising:

receiving one or more variable values associated with a quality of a tube orientation of a first food package, the one or more variable values indicating measurements by the food packaging machine of one or more physical parameters in one or more of sub-systems, the one or more physical parameters affecting the tube orientation of the first food package;

determining one or more control parameter values for the one or more of the sub-systems by processing the one or more variable values associated with the quality of the tube orientation of the first food package using a reinforcement learning model and a local control model, wherein determining the one or more control parameter values comprises:

processing the one or more variable values associated with the quality of the tube orientation of the first food package using the local control model to determine whether the quality of the tube orientation of the first food package meets a target quality;

at a first time, in response to the target quality being met, receiving a positive reward associated with the one or more variable values associated with the quality of the tube orientation of the first food package to train the reinforcement learning model;

at a second time, in response to the target quality not being met, receiving a negative reward associated with the one or more variable values associated with the quality of the tube orientation of the first food package to train the reinforcement learning model; and determining the one or more control parameter values based on the reinforcement learning model being trained on an accumulation of one or more positive rewards and one or more negative rewards, each associated with one or more variable values for a respective food package of a plurality of food packages; and adjusting operation of a tube formation sub-system of the one or more sub-systems in the food packaging machine in accordance with the one or more control parameter values determined for the one or more of the sub-systems to manage a tube orientation of a second food package.

2. The method according to claim 1, wherein the reinforcement learning model comprises a deep reinforcement learning model including a neural network.

3. The method according to claim 1, wherein adjusting the operation of the tube formation sub-system comprises adjusting one or more rollers of the tube formation sub-system by:

adjusting a tilt of the one or more rollers to move a web laterally along a length of the one or more rollers.

4. The method according to claim 3, wherein adjusting the tilt of the one or more rollers further causes a tube formed by the web to twist in a clockwise or counterclockwise direction around a central axis of the tube.

5. The method according to claim 2, wherein the neural network comprises one of: a convolution neural network, a recurrent neural network, a Long Short-Term Memory neural network, or a fully connected neural network.

6. The method according to claim 1, wherein:

the one or more variable values include measurements relating to the one or more physical parameters, the one or more physical parameters comprising at least one of: packaging web movement and control variables, web tension variables, packaging material characteristics, or food product type.

7. A food packaging machine comprising:

a plurality of sub-systems configured for managing a tube orientation;

a memory; and a processor, wherein the memory stores instructions that, when executed by the processor, cause the processor to perform a method comprising:

receiving one or more variable values associated with a quality of a tube orientation of a first food package, the one or more variable values indicating measurements by the food packaging machine of one or more physical parameters in one or more of sub-systems of the plurality of sub-systems, the one or more physical parameters affecting the tube orientation of the first food package;

determining one or more control parameter values for the one or more of the sub-systems by processing the one or more variable values associated with the quality of the tube orientation of the first food package using a reinforcement learning model and a local control model, wherein determining the one or more control parameter values comprises:

processing the one or more variable values associated with the quality of the tube orientation of the first food package using the local control model to determine whether the quality of the tube orientation of the first food package meets a target quality;

at a first time, in response to the target quality being met, receiving a positive reward associated with the one or more variable values associated with the quality of the tube orientation of the first food package to train the reinforcement learning model;

at a second time, in response to the target quality not being met, receiving a negative reward associated with the one or more variable values associated with the quality of the tube orientation of the first food package to train the reinforcement learning model; and determining the one or more control parameter values based on the reinforcement learning model being trained on an accumulation of one or more positive rewards and one or more negative rewards, each associated with one or more variable values for a respective food package of a plurality of food packages; and adjusting operation of a tube formation sub-system of the one or more sub-systems in the food packaging machine in accordance with the one or more control parameter values determined for the one or more of the sub-systems to manage a tube orientation of a second food package.

8. The food packaging machine according to claim 7, wherein the reinforcement learning model comprises a deep reinforcement learning model including a neural network.

9. The food packaging machine according to claim 7, wherein adjusting the operation of the tube formation sub-system comprises adjusting one or more rollers of the tube formation sub-system by:

adjusting a tilt of the one or more rollers in the food packaging machine to move a web laterally along a length of the one or more rollers.

10. The food packaging machine according to claim 9, wherein adjusting the tilt of the one or more rollers further causes a tube formed by the web to twist in a clockwise or counterclockwise direction around a central axis of the tube.

11. The food packaging machine according to claim 8, wherein the neural network comprises one of: a convolution neural network, a recurrent neural network, a Long Short-Term Memory neural network, or a fully connected neural network.

12. The food packaging machine according to claim 7, wherein:

the one or more variable values include measurements relating to the one or more the physical parameters, the one or more the physical parameters comprising at least one of: packaging web movement and control variables, web tension variables, packaging material characteristics, or food product type.

13. A computer program product comprising a non-transitory computer readable storage medium with instructions that, when executed to a processor, cause the processor to carry out the method according to claim 1.

* * * * *